(12) United States Patent
Nakayama

(10) Patent No.: US 8,180,136 B2
(45) Date of Patent: May 15, 2012

(54) IMAGE PROCESSING METHOD AND APPARATUS, AND RADIATION IMAGE PHOTOGRAPHING/PROCESSING METHOD AND APPARATUS

(75) Inventor: Hiroki Nakayama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 559 days.

(21) Appl. No.: 12/395,961

(22) Filed: Mar. 2, 2009

(65) Prior Publication Data

US 2009/0220140 A1 Sep. 3, 2009

(30) Foreign Application Priority Data

Feb. 29, 2008 (JP) ................. 2008-050787

(51) Int. Cl.
*G06K 9/00* (2006.01)
(52) U.S. Cl. ....................................... 382/132
(58) Field of Classification Search .................. 382/132
See application file for complete search history.

(56) References Cited

U.S. PATENT DOCUMENTS

| | | | |
|---|---|---|---|
| 5,150,421 A | 9/1992 | Morishita et al. | |
| 6,647,089 B1 * | 11/2003 | Virta et al. | 378/37 |
| 7,010,745 B1 | 3/2006 | Shimada et al. | |
| 7,248,729 B2 * | 7/2007 | Sugita | 382/132 |
| 7,418,122 B2 * | 8/2008 | Matsuura | 382/128 |
| 7,991,212 B2 * | 8/2011 | Miyamoto | 382/132 |
| 2004/0182991 A1 | 9/2004 | Sugita | |
| 2005/0069186 A1 * | 3/2005 | Kobayashi | 382/128 |

FOREIGN PATENT DOCUMENTS

| | | |
|---|---|---|
| JP | 2299640 A | 12/1990 |
| JP | 03-206572 A | 9/1991 |
| JP | 10-071138 A | 3/1998 |
| JP | 10-143634 A | 5/1998 |
| JP | 10-154226 A | 6/1998 |
| JP | 2001-016424 A | 1/2001 |
| JP | 2002-140714 A | 5/2002 |
| JP | 2004-283281 A | 10/2004 |
| JP | 2005-109790 A | 4/2005 |

OTHER PUBLICATIONS

Notice of Grounds for Rejection, dated Feb. 28, 2012, issued in corresponding JP Application No. 2008-050787, 9 pages in English and Japanese.

* cited by examiner

*Primary Examiner* — Rodney Fuller
(74) *Attorney, Agent, or Firm* — Sughrue Mion, PLLC

(57) ABSTRACT

Acquiring radiation image data representing a radiation image of a subject photographed using a radiation exposure field aperture, acquiring information of a radiation exposure field area determined by the exposure field aperture and relating it to the radiation image data based on the information, sequentially detecting pixel data of pixels from adjacent to the boundary line of the exposure field area toward the inner side thereof in the radiation image data, sequentially determining if the values of the detected pixel data are not greater than a predetermined threshold value, terminating the detection at a point where the value of the detected pixel data is greater than the predetermined threshold value, and performing a blackening process on pixel data of a pixel outside of the exposure field area and pixel data of a pixel whose value is determined to be not greater than the predetermined threshold value.

20 Claims, 8 Drawing Sheets

IMAGE PROCESSING METHOD AND APPARATUS, AND RADIATION IMAGE PHOTOGRAPHING/PROCESSING METHOD AND APPARATUS

BACKGROUND OF THE INVENTION

1. Field of the Invention

The present invention relates to an image processing method and apparatus, and radiation image photographing/processing apparatus that perform a blackening process on radiation image data representing a radiation image of a subject photographed using an exposure field aperture.

2. Description of the Related Art

It is practiced in the medical field to diagnose the presence of a disease or the progress of the disease by acquiring a radiation image of a subject as image data, displaying the radiation image on a display device, such as CRT or the like, based on the image data, and reading the displayed image to discover a lesion or observing the state of the lesion.

For that purpose, for example, X-ray mammography for breast cancer screening has been proposed. In the X-ray mammography, an image is generated by irradiating X-rays onto a breast, detecting X-rays transmitted through the breast by a cassette having therein a film, storage phosphor sheet, or flat panel detector, and reading out the detected radiation image as radiation image data. In the photographing for ordinary breast cancer screening, an 18×24 cm or 24×30 cm cassette is used, and close contact or magnification photographing is performed.

Then, where a suspected abnormal region is found in a breast, spot photographing is performed for the breast by locally compressing the breast with a pressing plate. Here, in order to acquire an X-ray image of the local area, the exposure area of radiation is limited by an exposure field aperture so that the X-rays are not irradiated other than the compressed area.

The spot photographing may generate an X-ray image of the portion of the breast on an area of a film or the like where the radiation is irradiated, but the other area does not receive radiation, whereby a so-called whited out image is generated, and when the entire radiation image is displayed, it becomes difficult for reading.

Consequently, Japanese Unexamined Patent Publication No. 2 (1990)-299640 (Patent Document 1) proposes to provide a detection means for detecting an X-ray exposure field area limited by an exposure field aperture and to perform a blackening process for increasing darkness in an area other than the X-ray exposure field area based on the detection result.

Performance of the blackening process only on an area other than the X-ray exposure field area as in the method described in Patent Document 1 has, for example, a problem, when the position of the film or the like in the cassette is displaced, that a discrepancy occurs between the position of the exposure field area detected in advance and the position of the exposure field area of the film or the like where the X-ray is actually irradiated, and a portion of a whited out area corresponding to the positional difference may possibly remain.

Further, the method performs the blackening process on the whited out area described above, so that if, for example, white pixel data are detected from the entire radiation image data, and the blackening process is performed on the detected white pixel data, then, for example, if a breast radiation image includes an image of a wire or the like attached to the breast, the pixel data of the image are also detected as white pixel data and the blackening process is performed thereon, causing another problem. In general photographing other than a breast, the radiation image sometimes includes a bone or the like, and the blackening process is performed on pixel data of the bone image, causing still another problem.

In view of the circumstances described above, it is an object of the present invention to provide an image processing method and apparatus, and radiation image photographing/processing apparatus capable of performing a blackening process on a whited out area without performing the blackening process on the inside of a radiation image of a subject and providing an easy-to-read radiation image.

SUMMARY OF THE INVENTION

A first image processing method of the present invention is a method including the steps of:

acquiring radiation image data representing a radiation image of a subject photographed using a exposure field aperture of radiation;

acquiring information of an exposure field area of the radiation determined by the exposure field aperture and relating the exposure field area to the radiation image data based on the information;

sequentially detecting pixel data of pixels from adjacent to the boundary line of the exposure field area toward the inner side thereof in the radiation image data;

sequentially determining whether or not the values of the detected pixel data are not greater than a predetermined threshold value;

terminating the detection at a point where the value of the detected pixel data is greater than the predetermined threshold value; and performing a blackening process on pixel data of a pixel outside of the exposure field area and pixel data of a pixel whose value is determined to be not greater than the predetermined threshold value.

A second image processing method of the present invention is a method including the steps of:

acquiring radiation image data representing a radiation image of a subject photographed using a exposure field aperture of radiation;

acquiring information of an exposure field area of the radiation determined by the exposure field aperture and relating the exposure field area to the radiation image data based on the information;

detecting pixel data of pixels within a predetermined area from adjacent to the boundary line of the exposure field area toward the inner side thereof in the radiation image data;

determining whether or not the values of the detected pixel data are not greater than a predetermined threshold value; and performing a blackening process on pixel data of a pixel outside of the exposure field area and pixel data of a pixel whose value is determined to be not greater than the predetermined threshold value.

In the first and second image processing methods of the present invention, position information of the exposure field area may be acquired based on the information of the exposure field aperture.

Further, the radiation image of the subject may be a radiation image of a subject photographed while the subject is compressed by a pressing plate, and position information of the exposure field area may be acquired based on the type of the pressing plate.

Still further, the radiation image of the subject may be a radiation image of a subject photographed while the subject is compressed by a pressing plate, and position information of the exposure field area may be acquired based on both the information of the exposure field aperture and the type of the pressing plate.

A first image processing apparatus of the present invention is an apparatus including:

a radiation image data acquisition unit for acquiring radiation image data representing a radiation image of a subject photographed using a exposure field aperture of radiation;

an exposure field area information acquisition unit for acquiring information of an exposure field area of the radiation determined by the exposure field aperture and relating the exposure field area to the radiation image data based on the information;

a white pixel determination unit for sequentially detecting pixel data of pixels from adjacent to the boundary line of the exposure field area toward the inner side thereof in the radiation image data, sequentially determining whether or not the values of the detected pixel data are not greater than a predetermined threshold value, and terminating the detection at a point where the value of the detected pixel data is greater than the predetermined threshold value; and a blackening unit for performing a blackening process on pixel data of a pixel outside of the exposure field area and pixel data of a pixel whose value is determined the white pixel determination unit to be not greater than the predetermined threshold value.

A second image processing apparatus of the present invention is an apparatus including:

a radiation image data acquisition unit for acquiring radiation image data representing a radiation image of a subject photographed using a exposure field aperture of radiation;

an exposure field area information acquisition unit for acquiring information of an exposure field area of the radiation determined by the exposure field aperture and relating the exposure field area to the radiation image data based on the information;

a white pixel determination unit for detecting pixel data of pixels within a predetermined area from adjacent to the boundary line of the exposure field area toward the inner side thereof in the radiation image data and determining whether or not the values of the detected pixel data are not greater than a predetermined threshold value; and a blackening unit for performing a blackening process on pixel data of a pixel outside of the exposure field area and pixel data of a pixel whose value is determined to be not greater than the predetermined threshold value by the white pixel determination unit.

In the first and second image processing apparatuses of the present invention, the exposure field area information acquisition unit may be a unit that acquires position information of the exposure field area based on the information of the exposure field aperture.

Further, the radiation image of the subject may be a radiation image of a subject photographed while the subject is compressed by a pressing plate, and the exposure field area information acquisition unit may be a unit that acquires position information of the exposure field area based on the type of the pressing plate.

Still further, the radiation image of the subject may be a radiation image of a subject photographed while the subject is compressed by a pressing plate, and the exposure field area information acquisition unit may be a unit that acquires position information of the exposure field area based on both the information of the exposure field aperture and the type of the pressing plate.

A first radiation image photographing/processing apparatus of the present invention is an apparatus including:

a radiation irradiation unit having a radiation source for emitting radiation toward a subject and an exposure field aperture for reducing an exposure field of radiation emitted from the radiation source on the subject;

a radiation image detector for detecting radiation irradiated by the radiation irradiation unit and transmitted through the subject and recording a radiation image of the subject;

a radiation image data acquisition unit for acquiring radiation image data representing the radiation image recorded by the radiation image detector;

an exposure field area information acquisition unit for acquiring information of an exposure field area of the radiation determined by the exposure field aperture and relating the exposure field area to the radiation image data based on the information;

a white pixel determination unit for sequentially detecting pixel data of pixels from adjacent to the boundary line of the exposure field area toward the inner side thereof in the radiation image data, sequentially determining whether or not the values of the detected pixel data are not greater than a predetermined threshold value, and terminating the detection at a point where the value of the detected pixel data is greater than the predetermined threshold value; and a blackening unit for performing a blackening process on pixel data of a pixel outside of the exposure field area and pixel data of a pixel whose value is determined to be not greater than the predetermined threshold value by the white pixel determination unit.

A second radiation image photographing/processing apparatus of the present invention is an apparatus including:

a radiation irradiation unit having a radiation source for emitting radiation toward a subject and an exposure field aperture for reducing an exposure field of radiation emitted from the radiation source on the subject;

a radiation image detector for detecting radiation irradiated by the radiation irradiation unit and transmitted through the subject and recording a radiation image of the subject;

a radiation image data acquisition unit for acquiring radiation image data representing the radiation image recorded by the radiation image detector;

an exposure field area information acquisition unit for acquiring information of an exposure field area of the radiation determined by the exposure field aperture and relating the exposure field area to the radiation image data based on the information;

a white pixel determination unit for detecting pixel data of pixels within a predetermined area from adjacent to the boundary line of the exposure field area toward the inner side thereof in the radiation image data and determining whether or not the values of the detected pixel data are not greater than a predetermined threshold value; and a blackening unit for performing a blackening process on pixel data of a pixel outside of the exposure field area and pixel data of a pixel whose value is determined to be not greater than the predetermined threshold value by the white pixel determination unit.

Further, in the first and second radiation image photographing/processing apparatuses of the present invention, the exposure field area information acquisition unit may be a unit that acquires position information of the exposure field area based on the information of the exposure field aperture.

Still further, each of the apparatuses may include a pressing plate for compressing the subject, and the exposure field area information acquisition unit may be a unit that acquires position information of the exposure field area based on the type of the pressing plate.

Further, each of the apparatuses may include a pressing plate for compressing the subject, and the exposure field area information acquisition unit may be a unit that acquires position information of the exposure field area based on both the information of the exposure field aperture and the type of the pressing plate.

Still further, each of the apparatuses may include a blackening process selection unit for receiving a selection signal for selecting between performance and non-performance of the blackening process, and the blackening unit may be a unit that does not perform the blackening process when a selection signal not to perform the blackening process is received by the blackening process selection unit.

According to the first image processing method and apparatus, and radiation image photographing/processing apparatus of the present invention, pixel data of pixels are sequentially detected from adjacent to the boundary line of the exposure field area toward the inner side thereof in the radiation image data, determinations are sequentially made as to whether or not the values of the detected pixel data are not greater than a predetermined threshold value, then the detection is terminated at a point where the value of the detected pixel data is greater than the predetermined threshold value, and a blackening process is performed on the pixel data of a pixel outside of the exposure field area and the pixel data of a pixel whose value is determined to be not greater than the predetermined threshold value. This allows detection of only a whited out area, thereby a blackening process may be performed on the whited out area without performing the blackening process on the inside of a radiation image of a subject, so that an easy-to-read radiation image may be obtained.

According to the second image processing method and apparatus, and radiation image photographing/processing apparatus of the present invention, pixel data of pixels are detected within a predetermined area from adjacent to the boundary line of the exposure field area toward the inner side thereof in the radiation image data, determinations are made as to whether or not the values of the detected pixel data are not greater than a predetermined threshold value, and a blackening process is performed on the pixel data of a pixel outside of the exposure field area and the pixel data of a pixel whose value is determined to be not greater than the predetermined threshold value. This allows detection of only a whited out area, thereby a blackening process may be performed on the whited out area without performing the blackening process on the inside of a radiation image of a subject, so that an easy-to-read radiation image may be obtained.

In the first and second radiation image photographing/processing apparatuses of the present invention, if an arrangement is adopted to receive a selection signal for selecting between performance and non-performance of the blackening process, and not to perform the blackening process when a selection signal not to perform the blackening process is received, then, for example, verification to what extent the radiation is actually irradiated (i.e., if the radiation is irradiated on an unnecessarily wider area than the detector), which is sometimes performed as part of the performance management of the apparatuses, may be performed appropriately by causing the blackening process not to be performed.

DESCRIPTION OF THE PREFERRED EMBODIMENTS

Figure 1:
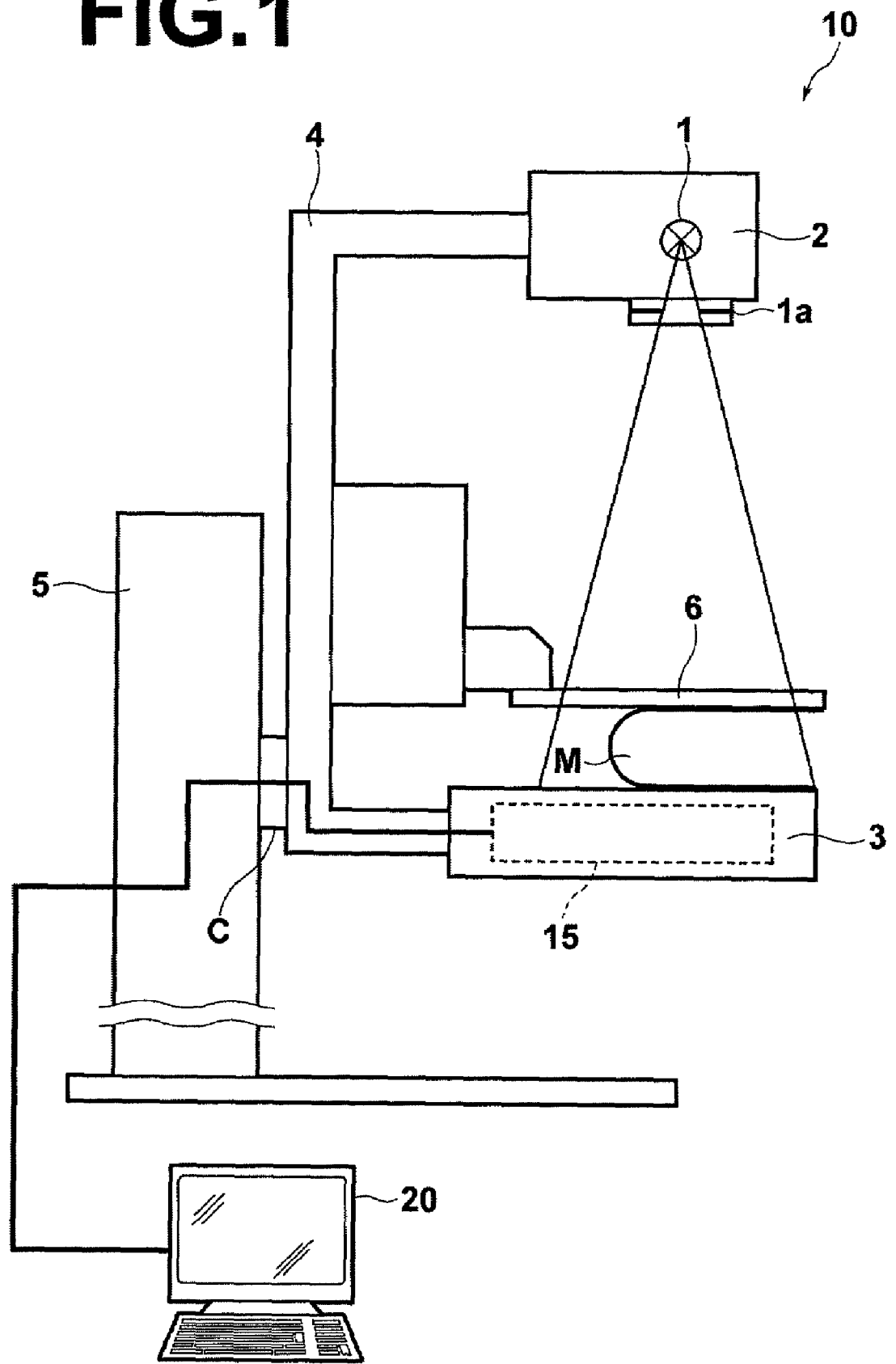
FIG. 1 is a schematic configuration diagram of a breast image photographing/display system to which a first and a second embodiments of image processing apparatus and radiation image photographing/processing apparatus of the present invention are applied.

Hereinafter, a breast image photographing/display system using a first embodiment of the image processing apparatus and radiation image photographing/processing apparatus of the present invention will be described with reference to the accompanying drawings. The breast image photographing/display system has characteristic features in the image processing method of radiation image data, but the schematic configuration of the entire system will be described first. FIG. 1 illustrates the schematic configuration of the breast image photographing/display system.

Breast image photographing/display system according to the present embodiment includes breast image photographing machine 10 for photographing a breast radiation image and breast image display device 20 for displaying a breast radiation image based on radiation image data representing the breast radiation image photographed by breast image photographing machine 10.

Breast image photographing machine 10 includes radiation irradiation unit 2 having therein radiation source 1, photographing platform 3 on which a photographing subject, breast M, is placed, and an arm 4 rotatably attached to base 5 by shaft C with radiation irradiation unit 2 and photographing platform 3 attached at end portions thereof so as to face with each other. Pressing plate 6 for compressing breast M placed on photographing platform 3 is attached to arm 4.

Radiation irradiation unit 2 is provided with exposure field aperture unit 1a for limiting the irradiation area of radiation emitted from radiation source 1 onto the subject. Exposure field aperture unit 1a has a exposure field aperture that forms an opening of a rectangular shape or the like for passing radiation therethrough, and the size, shape, position, and the like of the opening are changeable according to photographing conditions including the photographing region. The outside portion of the opening is formed of a material that absorb radiation, such as lead or the like, and the irradiation area of radiation emitted from radiation source 1 onto the subject is limited by the outside portion of the opening. Exposure field aperture information, including the size, shape, position, and the like, is set and inputted through a not shown predetermined setting unit, and the information is outputted also to breast image display device 20.

Pressing plate 6 is removably attached to arm 4, thus pressing plates of various sizes may be attached to arm 4 according to the photographing conditions. Pressing plates include, for example, an overall photographing pressing plate used for photographing the whole of a breast and a spot photographing pressing plate used for photographing only a portion of the breast.

Cassette 15 encasing an image recording medium, such as flat panel detector, storage phosphor sheet, silver salt film, or the like, is placed inside photographing platform 3.

As for the flat panel detector, for example, either of so-called a direct conversion type or an indirect conversion type may be used from the view point of recording mode. From the viewpoint of readout mode, either of so-called optical readout type or TFT readout type may be used. Electrical signals detected by the flat panel detector are converted to digital radiation image data and outputted to breast image display device 20.

Where a storage phosphor sheet is placed in cassette 15, an excitation light irradiation unit for irradiating excitation light onto the storage phosphor sheet and a readout unit having a line sensor for detecting stimulated luminescence light emitted from the storage phosphor sheet as electrical signals are placed with the storage phosphor sheet.

Where a silver salt film is placed in cassette 15, radiation image photographed on the film is photoelectrically read out by a predetermined reader unit, and the readout radiation image data are outputted to breast image display device 20.

Figure 2:
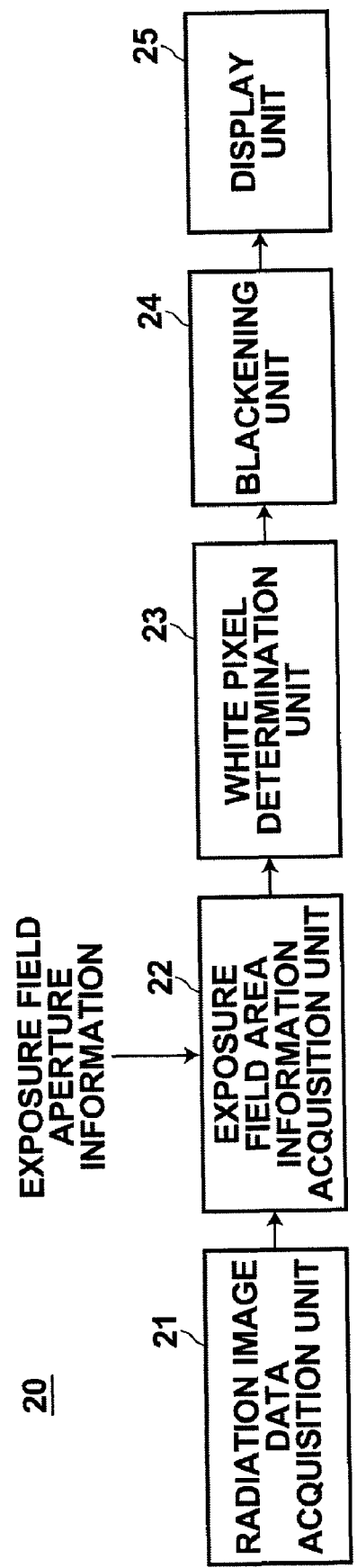
FIG. 2 is a schematic block diagram of a breast image display unit of the breast image photographing/display system shown in FIG. 1.

As shown in FIG. 2, breast image display device 20 includes radiation image data acquisition unit 21 that acquires radiation image data outputted from breast image photographing machine 10 or the reader unit, exposure field area information acquisition unit 22 that acquires information of exposure field area based on inputted exposure field aperture information and relates the exposure field area and the radiation image data to each other based on the acquired information, white pixel determination unit 23 that sequentially detects pixel data of pixels from adjacent to the boundary line of an exposure field area toward the inner side thereof in the radiation image data and determines whether or not the detected pixel data are white pixel data, blackening unit 24 that performs a blackening process on pixel data of a pixel outside of the exposure field area and white pixel data of a pixel determined by white pixel determination unit 23 as white pixel data, and display unit 25 that displays a radiation image based on the radiation image data blackening-processed by blackening unit 24. It is noted that each unit of breast image display device 20 described above is controlled by a not shown control unit.

Each unit of breast image display device 20 will now be described in more detail.

Radiation image data acquisition unit 21 includes a memory for storing radiation image data, and it stores inputted radiation image data in the memory, then outputs the radiation image data stored in the memory to exposure field area information acquisition unit 22.

Exposure field area information acquisition unit 22 receives exposure field aperture information outputted from a predetermined setting unit, and acquires information of radiation exposure field area, such as the size, shape, position, and the like based on the exposure field aperture information. More specifically, for example, a table that relates exposure field aperture information and exposure field area information to each other may be provided in advance to allow exposure field area information acquisition unit 22 to acquire exposure field area information by referring to the table. It is noted that the exposure field area information is information that indicates the size, shape, position, and the like of an exposure field area in a preset radiation image data coordinate system. Then, based on the exposure field area information acquired in the manner as described above, exposure field area information acquisition unit 22 relates the inputted radiation image data and the exposure field area to each other.

White pixel determination unit 23 sequentially detects pixel data of pixels from adjacent to the boundary of an exposure field area toward the inner side thereof in the radiation image data and determines whether or not the detected pixel data are white pixel data, as described above, the detection method of which will be described in detail later. Then, white pixel determination unit 23 determines the detected pixel data as white pixel data if the value of the detected pixel data is not greater than a predetermined threshold value, and outputs the position information of the white pixel data to blackening unit 24.

Blackening unit 24 receives radiation image data with an exposure field area related thereto, and performs a blackening process on pixel data of a pixel outside of the exposure field area of the inputted radiation image data and white pixel data of a pixel determined by white pixel determination unit 23 as white pixel data. The blackening process is, for examples a process for converting white pixel data to black pixel data, but not necessarily be black pixel data, and the blackening process may be a process that converts white pixel data to other pixel data, as long as the process may increase the darkness of the white pixel data.

Display unit 25 includes a monitor and displays the entire radiation image including the breast radiation image on the monitor.

Figure 7:
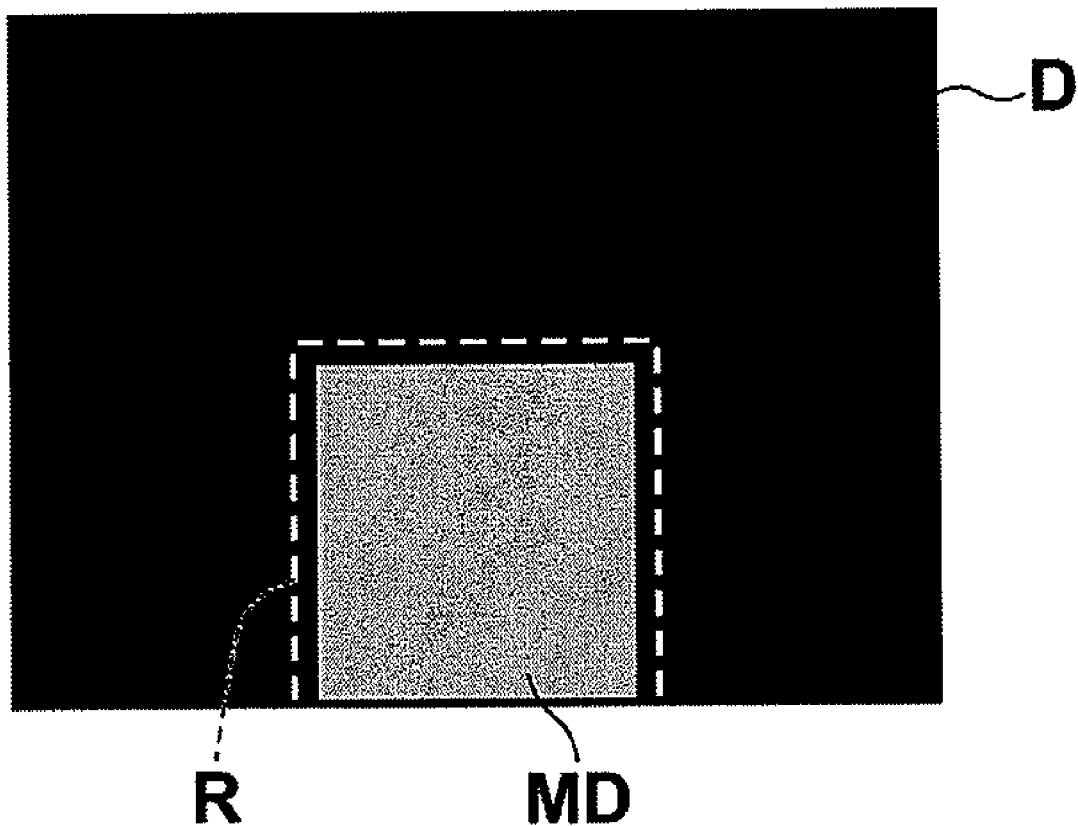
FIG. 7 illustrates radiation image data when the blackening process is also performed on the whited out area.
Figure 8:
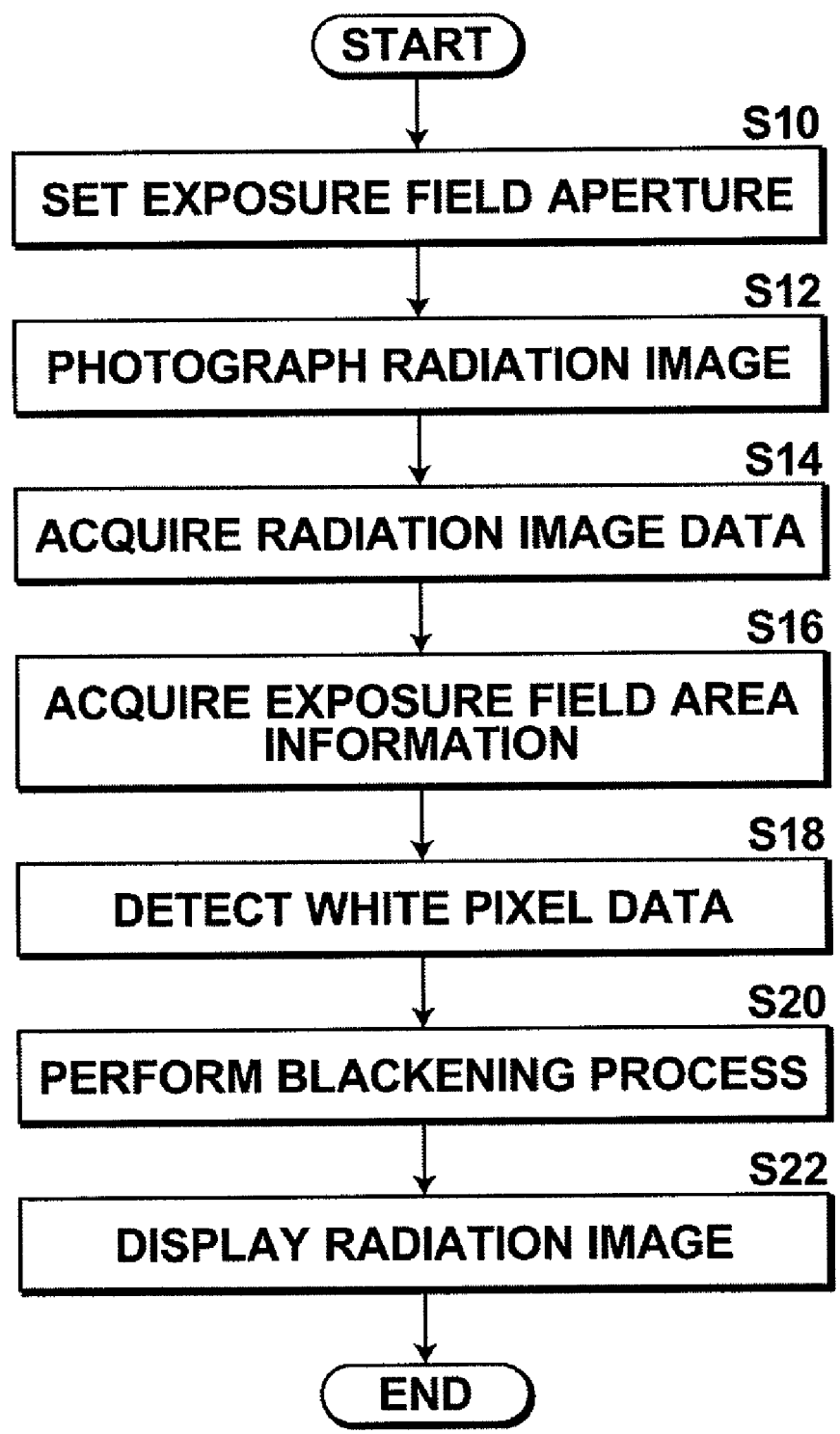
FIG. 8 is a flowchart illustrating an operation of the breast image photographing/display system shown in FIG. 1.

Next, an operation of the breast image photographing/display system of the present embodiment will be described with reference to FIGS. 1 to 7 and the flowchart shown in FIG. 8.

When a person under examination stands on the side of the breast image photographing machine 10, photographing platform 3 is moved to a height according to the height of the person, and arm 4 is rotated according to the size and shape of the breast of the person. Then, after the breast of the person is placed on photographing platform 3, pressing plate is moved to cause the breast to become an appropriate thickness for photographing. Here, it is assumed that a spot photographing pressing plate is used.

Figure 3:
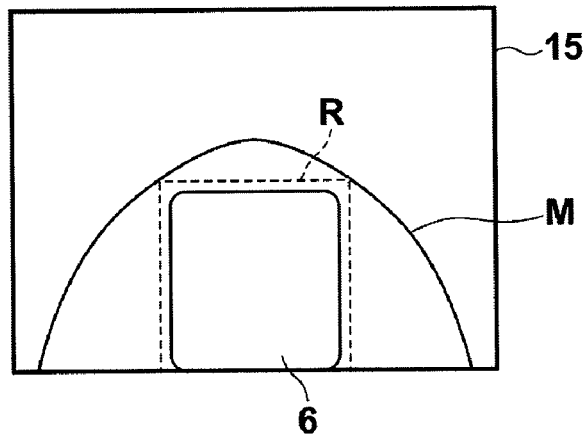
FIG. 3 illustrates the positional relationship among the cassette, breast, pressing plate, and exposure field area at the time of photographing a radiation image of the breast.

Then, exposure field aperture information is set by the radiographer through the setting unit (S10). In the present embodiment, spot photographing is performed so that the exposure field aperture is set such that the exposure field becomes appropriate for the spot photographing. Then, the size, shape, position, and the like of the opening of the exposure field aperture is set based on the exposure field aperture information set by the radiographer. FIG. 3 shows the positional relationship among cassette 15, breast M, exposure field area R and pressing plate 6.

Then, after the compression of the breast and setting of the exposure field aperture are completed, radiation is emitted from radiation source 1 of radiation irradiation unit 2 and irradiated on the breast in which the exposure field area thereof is limited by exposure field aperture unit 1a. Then, radiation transmitted through the breast of the person under examination is irradiated on cassette 15 and a radiation image of the breast is recorded on an image recording medium in cassette 15, whereby photographing of a radiation image is completed (S12).

Next, radiation image data representing the breast radiation image recorded on the image recording medium in cassette 15 are read out, outputted to breast image display device 20, and received by radiation image data acquisition unit 21, then stored in the memory of radiation image data acquisition unit 21 (S14).

Then, the radiation image data acquired by radiation image data acquisition unit 21 are outputted to exposure field area information acquisition unit 22. Exposure field area information acquisition unit 22 also receives the exposure field aperture information set by the radiographer, and acquires exposure field area information based on the received exposure field aperture information (S16). Then, exposure field area information acquisition unit 22 relates the inputted radiation image data and exposure field area to each other based on the exposure field area information.

Figure 4:
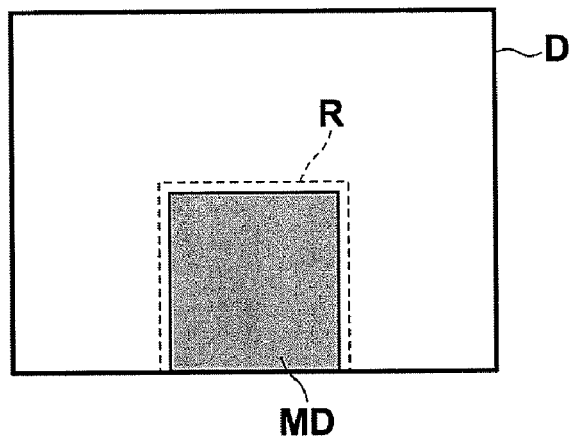
FIG. 4 illustrates the positional relationship between a preset exposure field area on radiation image data and breast image data read out from the area where radiation is actually irradiated.

Now, referring to FIG. 4, there is provided the relationship among radiation image data D, exposure field area R, and breast image data MD representing a radiation image of a portion of a breast. As shown in FIG. 4, the positional relationship between the exposure field area preset on the image recording medium and the exposure field area actually exposed on the image recording medium is lost due to positional displacement of the image recording medium in cassette 15 or the like, that is, the position of exposure field area R preset in the radiation image data and the position of breast image data MD read out from the area actually exposed by the radiation do not correspond to each other but displaced.

Figure 5:
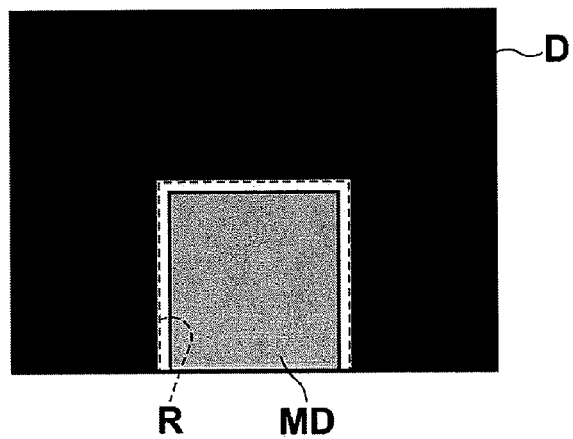
FIG. 5 illustrates radiation image data when a blackening process is performed only on the area outside of the preset exposure field area.

Consequently, where a blackening process for blackening pixel data in the area other than exposure field area R is performed on the radiation image data with exposure field area R related in the manner as described above, the image will have a whited out area as shown in FIG. 5, causing the image less favorable as a diagnostic image.

Therefore, in the present embodiment, a configuration is adopted in which a whited out area is detected and the blackening process is performed also on the whited out area. The detection of the whited out area is performed by sequentially detecting pixel data of pixels from the boundary line of exposure field area R toward the inner side thereof in the radiation image data, and determining whether or not the detected pixel data are white pixel data (S18).

Figure 6A:
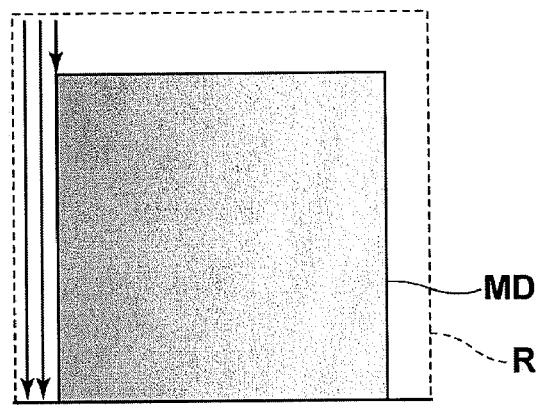
FIGS. 6A to 6D illustrate a whited out area detection method in the breast image photographing/display system to which the first embodiment of the present invention is applied.

More specifically, as illustrated in FIG. 6A, pixel data are sequentially detected downward from the top left pixel of exposure field area R along the boundary line to determine whether or not the detected pixel data are white pixel data. When the detection is performed to the bottom pixel, and if all of pixel data are determined to be white pixel data, then pixel data in the next pixel column toward the inner side of exposure field area R are sequentially detected to determine whether or not the detected pixel data are white pixel data. In this way, pixel data are sequentially detected with respect to each pixel column toward the inner side of exposure field area R to determine whether or not the detected pixel data are white pixel data. Then, if pixel data of a pixel is determined not to be white pixel data, that is, the value of the detected pixel data is greater than a predetermined threshold value and determined to be pixel data of a portion of breast image data MD in the middle of the detection, the pixel data detection is terminated.

Figure 6B:
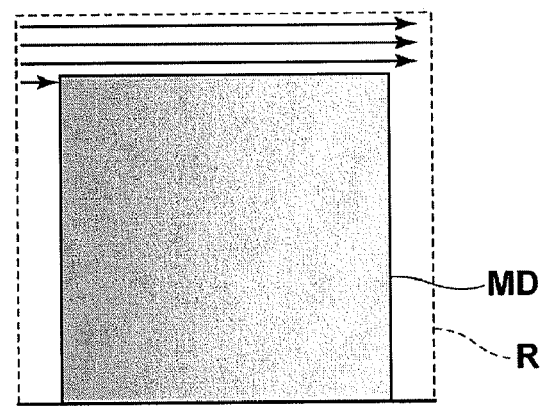

Next, as illustrated in FIG. 6B, pixel data are sequentially detected rightward from the top left pixel of exposure field area R along the boundary line to determine whether or not the detected pixel data are white pixel data. When the detection is performed to the rightmost pixel, and if all of pixel data are determined to be white pixel data, then pixel data in the next pixel row toward the inner side of exposure field area R are sequentially detected to determine whether or not the detected pixel data are white pixel data. In this way, pixel data are sequentially detected with respect to each pixel row toward the inner side of exposure field area R to determine whether or not the detected pixel data are white pixel data. Then, if pixel data of a pixel is determined not to be white pixel data, that is, the value of the detected pixel data is greater than a predetermined threshold value and determined to be pixel data of a portion of breast image data MD in the middle of the detection, the pixel data detection is terminated.

Figure 6C:
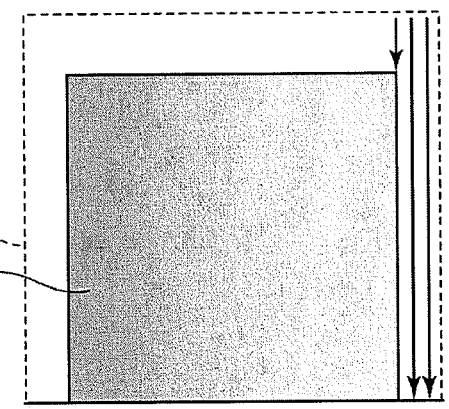

Next, as illustrated in FIG. 6C, pixel data are sequentially detected downward from the top right pixel of exposure field area R along the boundary line to determine whether or not the detected pixel data are white pixel data. When the detection is performed to the bottom pixel, and if all of pixel data are determined to be white pixel data, then pixel data in the next pixel column toward the inner side of exposure field area R are sequentially detected to determine whether or not the detected pixel data are white pixel data. In this way, pixel data are sequentially detected with respect to each pixel column toward the inner side of exposure field area R to determine whether or not the detected pixel data are white pixel data. Then, if pixel data of a pixel is determined not to be white pixel data, that is, the value of the detected pixel data is greater than a predetermined threshold value and determined to be pixel data of a portion of breast image data MD in the middle of the detection, the pixel data detection is terminated.

Figure 6D:
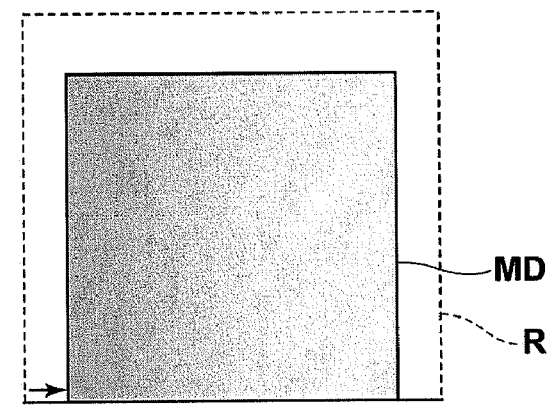

Next, as illustrated in FIG. 6D, pixel data are sequentially detected rightward from the bottom left pixel of exposure field area R along the boundary line to determine whether or not the detected pixel data are white pixel data. Then, as in the manner described above, pixel data in the next pixel row toward the inner side of exposure field area R are sequentially detected to determine whether or not the detected pixel data are white pixel data. In the present embodiment, pixel data of a pixel is determined not to be white pixel data, that is, the value of the detected pixel data is greater than a predetermined threshold value and determined to be pixel data of a portion of breast image data MD in the middle of the detection of pixel data in the bottom pixel row, the pixel data detection is terminated thereat.

The detection of pixel data shown in FIGS. 6A to 6D and determination of white pixel data allows the detection of the white pixel data in the area other than the pixel data in breast image data MD. In this way, white pixel data in the area other than the pixel data in breast image data MD are detected, and position information of the pixel data, that is, the whited out area information is acquired. In the present embodiment, pixel data are detected inward from the boundary of exposure field area, but the detection may be started from adjacent to the boundary line of exposure field area R, for example, from a line slightly outside of the boundary line of exposure field area R toward the inner side thereof.

Thereafter, radiation image data D with the exposure field area related thereto and the whited out area information acquired in the manner as described above are inputted to blackening unit 24. With respect to inputted radiation image data D, blackening unit 24 performs a blackening process for blackening pixel data outside of exposure field area R and pixel data in the whited out area. FIG. 7 illustrates radiation image data D after the blackening process performed in the manner as described above.

Then, blackening-processed radiation image data D are outputted to display unit 25 and display unit 25 displays a radiation image based on the blackening-processed inputted radiation image data (S22).

In the present embodiment, pixel data are detected in the manner as indicated by the arrows in FIGS. 6A to 6D, but any other method may be employed as long as it does not detect pixel data in breast image data MD as white pixel data.

Figure 9A:
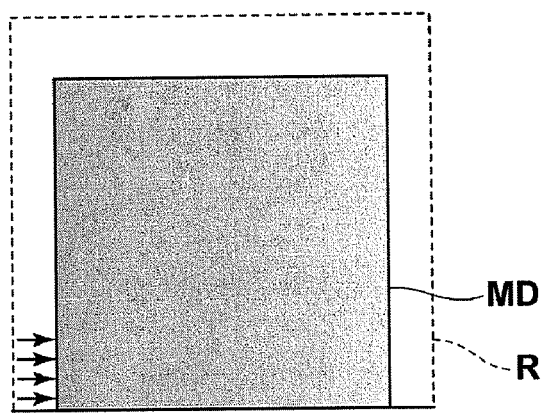
FIGS. 9A to 9D illustrate an alternative whited out area detection method.
Figure 9B:
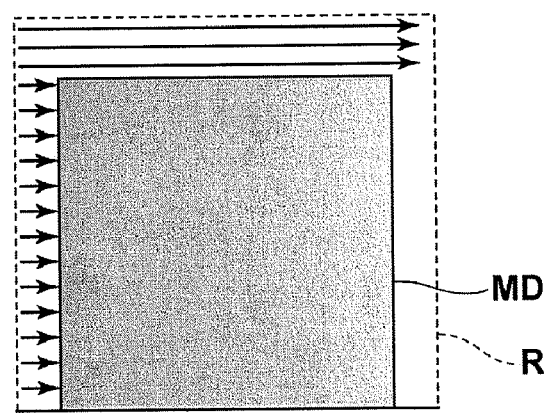

For example, as illustrated in FIG. 9A, pixel data are sequentially detected rightward, i.e., toward the inner side of exposure field area R from pixel data of the bottom left pixel to determine whether or not the detected pixel data are white pixel data. Then, the detection is terminated at a point where the detected pixel data are determined not to be white pixel data, that is, the value of the detected pixel data is greater than a predetermined threshold value and determined to be pixel data of a portion of breast image data MD in the middle of the detection or at a point where pixel data to the rightmost pixel of exposure field area R are detected whichever earlier, then the pixel data detection is restarted rightward in the next upper row. Then, as illustrated in FIG. 9B, the detection of pixel data and determination of white pixel data are sequentially performed upward with respect to pixel rows.

Figure 9C:
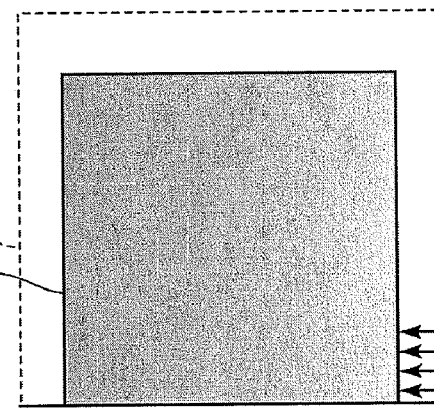
Figure 9D:
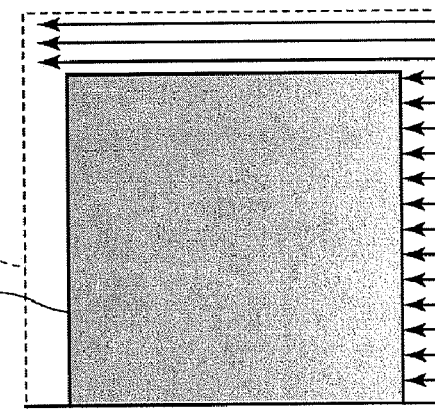

Next, as illustrated in FIG. 9C, pixel data are sequentially detected leftward, i.e., toward the inner side of exposure field area R from the bottom right pixel of exposure field area R to determine whether or not the detected pixel data are white pixel data. Then, the detection is terminated at a point where the detected pixel data are determined not to be white pixel data, that is, the value of the detected pixel data is greater than a predetermined threshold value and determined to be pixel data of a portion of breast image data MD in the middle of the detection or at a point where pixel data to the leftmost pixel of exposure field area R are detected whichever earlier, then the pixel data detection is restarted leftward in the next upper row. Then, as illustrated in FIG. 9D, the detection of pixel data and determination of white pixel data are sequentially performed upward with respect to pixel rows.

The method of detecting white pixel data illustrated in FIGS. 9A to 9D may also detect only the whited out area without detecting pixel data in breast image data MD as white pixel data. In the description of FIGS. 9A to 9D, pixel data are detected inward from the boundary of exposure field area R, the pixel data detection may be started from adjacent to the boundary line of exposure field area R, for example, from a line slightly outside of the boundary line of exposure field area R toward the inner side thereof.

Next, a breast image photographing/display system using a second embodiment of the image processing apparatus and radiation image photographing/processing apparatus of the present invention will be described. The schematic configuration of the breast image photographing/display system according to the second embodiment is identical to that of the breast image photographing/display system according to the first embodiment. The breast image photographing/display system according to the second embodiment differs from the breast image photographing/display system according to the first embodiment only in the method for detecting white pixel data.

Figure 10:
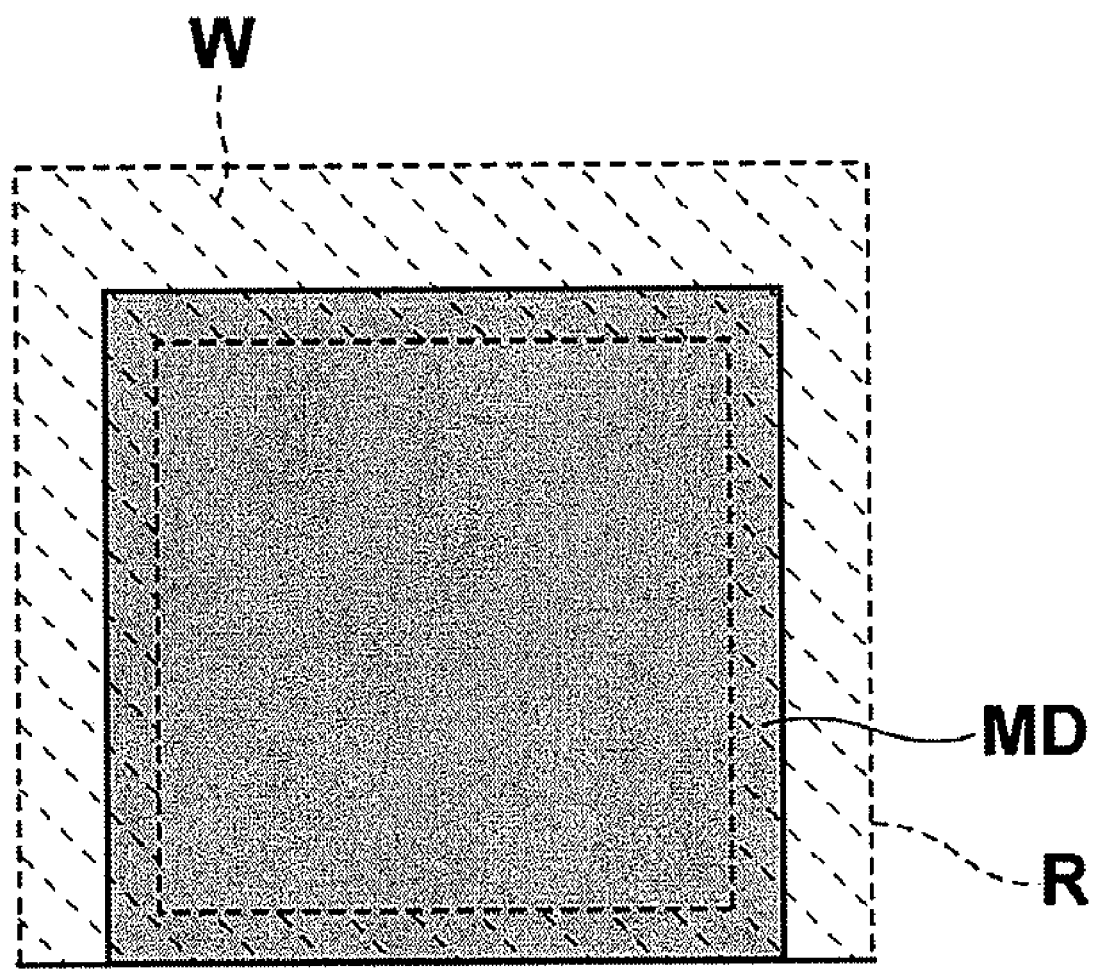
FIG. 10 illustrates a whited out area detection method in the breast image photographing/display system to which the second embodiment of the present invention is applied.

The target area for determining white pixel data is preset in white pixel determination unit 23 of the breast image photographing/display system according to the second embodiment. More specifically, as illustrated in FIG. 10, pixel data of pixels in predetermined area W from the boundary of exposure field area R toward the inner side thereof are set as the target pixel data for the determination of white pixel data. Predetermined area W may be determined by measuring the difference between the position of exposure field area R preset in the radiation image data and the position of breast image data MD read out from the actually exposed area in advance and based on the measurement result.

Then, pixel data of pixels in area W preset in the manner as described above are detected to determine whether or not the detected pixel data are white pixel data. Then, position information of pixel data determined to be white pixel data is acquired as whited out area information which is outputted to blackening unit 24.

Other aspects of the operation than the white pixel data detection are identical to those of the breast image photographing/display system according to the first embodiment.

In the breast image photographing/display systems according to the first and second embodiments, exposure field area information acquisition unit 22 is configured to receive exposure field aperture information and to obtain exposure field area information based on the exposure field aperture information. But other configurations are also possible. For example, the type of breast pressing plate and exposure field area have a correlation with each other, thus a table or the like that relates the types of pressing plates to the exposure field areas may be provided in advance. Then, exposure field area information acquisition unit 22 may be configured to detect the type of pressing plate attached to arm 4 and to acquire the exposure field area information by referring to the table.

Further, exposure field area information acquisition unit 22 may also be configured to acquire the position information of exposure field area based on both the exposure field aperture information and the type of pressing plate. More specifically, exposure field area information acquisition unit 22 may be configure to receive the exposure field aperture information and the type of pressing plate and to acquire the position information of exposure field area corresponding to the exposure field aperture information and the position information of exposure field area corresponding to the type of pressing plate to determine whether or not the position information of the two exposure field areas matches with each other. Then if the two exposure field areas match with each other, exposure field area information acquisition unit 22 acquires the position information of the exposure field area, while if they do not match with each other, it issues an alert by displaying the mismatching and causes blackening unit 24 not to perform the blackening process.

Further, in the breast image photographing/display systems according to the first and second embodiments, white pixel data are detected first, and then the blackening process for blackening pixel data outside of exposure field area R and pixel data in the whited out area is performed. But, an arrangement may be adopted in which the blackening process for blackening pixel data outside of exposure field area R is performed first after relating the radiation image data and exposure field area R to each other, and then a detection of whited out area is performed and the blackening process for blackening pixel data in the whited out area is performed.

Still further, in the breast image photographing/display systems according to the first and second embodiments, for example, verification is sometimes performed, as part of the performance management of the systems, that to what extent the radiation is actually irradiated (i.e., if the radiation is irradiated on an unnecessarily wider area than the detector). In such a case, the blackening process may hinder the verification. Therefore, a blackening process selection unit for receiving a selection signal for selecting between performance and non-performance of the blackening process may be provided in breast image display device 20, and an arrangement may be adopted in which, when a selection signal not to perform the blackening process inputted from a predetermined input means is received by the blackening process selection unit, a radiation image based directly on the radiation image data is displayed without performing the blackening process by blackening unit 24.

Here, the description has be made of a case in which embodiments of the image processing apparatus and radiation image photographing/processing apparatus of the present invention are applied to a breast image photographing/display system, but the application of the present invention is not limited to the breast radiation image photographing/display system and the present invention may also be applicable to a radiation image photographing/display system, having an exposure field aperture, for photographing any other region as the photographing target.

What is claimed is:

1. An image processing method comprising the steps of:
   acquiring radiation image data representing a radiation image of a subject photographed using a exposure field aperture of radiation;
   acquiring information of an exposure field area of the radiation determined by the exposure field aperture and relating the exposure field area to the radiation image data based on the information;
   sequentially detecting pixel data of pixels from adjacent to the boundary line of the exposure field area toward the inner side thereof in the radiation image data;
   sequentially determining whether or not the values of the detected pixel data are not greater than a predetermined threshold value;
   terminating the detection at a point where the value of the detected pixel data is greater than the predetermined threshold value; and
   performing a blackening process on pixel data of a pixel outside of the exposure field area and pixel data of a pixel whose value is determined to be not greater than the predetermined threshold value.

2. The image processing method as claimed in claim 1, wherein position information of the exposure field area is acquired based on the information of the exposure field aperture.

3. The image processing method as claimed in claim 1, wherein:
   the radiation image of the subject is photographed while the subject is compressed by a pressing plate; and
   position information of the exposure field area is acquired based on the type of the pressing plate.

4. The image processing method as claimed in claim 1, wherein:
   the radiation image of the subject is photographed while the subject is compressed by a pressing plate; and
   position information of the exposure field area is acquired based on both the information of the exposure field aperture and the type of the pressing plate.

5. An image processing method comprising the steps of:
   acquiring radiation image data representing a radiation image of a subject photographed using a exposure field aperture of radiation;
   acquiring information of an exposure field area of the radiation determined by the exposure field aperture and relating the exposure field area to the radiation image data based on the information;
   detecting pixel data of pixels within a predetermined area from adjacent to the boundary line of the exposure field area toward the inner side thereof in the radiation image data;
   determining whether or not the values of the detected pixel data are not greater than a predetermined threshold value; and
   performing a blackening process on pixel data of a pixel outside of the exposure field area and pixel data of a pixel whose value is determined to be not greater than the predetermined threshold value.

6. The image processing method as claimed in claim 5, wherein position information of the exposure field area is acquired based on the information of the exposure field aperture.

7. The image processing method as claimed in claim 5, wherein:
   the radiation image of the subject is photographed while the subject is compressed by a pressing plate; and
   position information of the exposure field area is acquired based on the type of the pressing plate.

8. The image processing method as claimed in claim 5, wherein:
   the radiation image of the subject is photographed while the subject is compressed by a pressing plate; and
   position information of the exposure field area is acquired based on both the information of the exposure field aperture and the type of the pressing plate.

9. An image processing apparatus comprising:
   a radiation image data acquisition unit for acquiring radiation image data representing a radiation image of a subject photographed using a exposure field aperture of radiation;
   an exposure field area information acquisition unit for acquiring information of an exposure field area of the radiation determined by the exposure field aperture and relating the exposure field area to the radiation image data based on the information;
   a white pixel determination unit for sequentially detecting pixel data of pixels from adjacent to the boundary line of the exposure field area toward the inner side thereof in the radiation image data, sequentially determining whether or not the values of the detected pixel data are not greater than a predetermined threshold value, and terminating the detection at a point where the value of the detected pixel data is greater than the predetermined threshold value; and
   a blackening unit for performing a blackening process on pixel data of a pixel outside of the exposure field area and pixel data of a pixel whose value is determined to be not greater than the predetermined threshold value by the white pixel determination unit.

10. The image processing apparatus as claimed in claim 9, wherein the exposure field area information acquisition unit acquires position information of the exposure field area based on the information of the exposure field aperture.

11. The image processing apparatus as claimed in claim 9, wherein:
    the radiation image of the subject is photographed while the subject is compressed by a pressing plate; and
    the exposure field area information acquisition unit acquires position information of the exposure field area based on the type of the pressing plate.

12. The image processing apparatus as claimed in claim 9, wherein:
    the radiation image of the subject is photographed while the subject is compressed by a pressing plate; and
    the exposure field area information acquisition unit acquires position information of the exposure field area based on both the information of the exposure field aperture and the type of the pressing plate.

13. An image processing apparatus comprising:
a radiation image data acquisition unit for acquiring radiation image data representing a radiation image of a subject photographed using a exposure field aperture of radiation;
an exposure field area information acquisition unit for acquiring information of an exposure field area of the radiation determined by the exposure field aperture and relating the exposure field area to the radiation image data based on the information;
a white pixel determination unit for detecting pixel data of pixels within a predetermined area from adjacent to the boundary line of the exposure field area toward the inner side thereof in the radiation image data and determining whether or not the values of the detected pixel data are not greater than a predetermined threshold value; and
a blackening unit for performing a blackening process on pixel data of a pixel outside of the exposure field area and pixel data of a pixel whose value is determined to be not greater than the predetermined threshold value by the white pixel determination unit.

14. The image processing apparatus as claimed in claim 13, wherein the exposure field area information acquisition unit acquires position information of the exposure field area based on the information of the exposure field aperture.

15. The image processing apparatus as claimed in claim 13, wherein:
the radiation image of the subject is photographed while the subject is compressed by a pressing plate; and
the exposure field area information acquisition unit acquires position information of the exposure field area based on the type of the pressing plate.

16. The image processing apparatus as claimed in claim 13, wherein:
the radiation image of the subject is photographed while the subject is compressed by a pressing plate; and
the exposure field area information acquisition unit acquires position information of the exposure field area based on both the information of the exposure field aperture and the type of the pressing plate.

17. A radiation image photographing/processing apparatus, comprising:
a radiation irradiation unit having a radiation source for emitting radiation toward a subject and an exposure field aperture for reducing an exposure field of radiation emitted from the radiation source on the subject;
a radiation image detector for detecting radiation irradiated by the radiation irradiation unit and transmitted through the subject and recording a radiation image of the subject;
a radiation image data acquisition unit for acquiring radiation image data representing the radiation image recorded by the radiation image detector;
an exposure field area information acquisition unit for acquiring information of an exposure field area of the radiation determined by the exposure field aperture and relating the exposure field area to the radiation image data based on the information;
a white pixel determination unit for sequentially detecting pixel data of pixels from adjacent to the boundary line of the exposure field area toward the inner side thereof in the radiation image data, sequentially determining whether or not the values of the detected pixel data are not greater than a predetermined threshold value, and terminating the detection at a point where the value of the detected pixel data is greater than the predetermined threshold value; and
a blackening unit for performing a blackening process on pixel data of a pixel outside of the exposure field area and pixel data of a pixel whose value is determined to be not greater than the predetermined threshold value by the white pixel determination unit.

18. The radiation image photographing/processing apparatus as claimed in claim 17, wherein:
the apparatus comprises a blackening process selection unit for receiving a selection signal for selecting between performance and non-performance of the blackening process; and
the blackening unit does not perform the blackening process when a selection signal not to perform the blackening process is received by the blackening process selection unit.

19. A radiation image photographing/processing apparatus, comprising:
a radiation irradiation unit having a radiation source for emitting radiation toward a subject and an exposure field aperture for reducing an exposure field of radiation emitted from the radiation source on the subject;
a radiation image detector for detecting radiation irradiated by the radiation irradiation unit and transmitted through the subject and recording a radiation image of the subject;
a radiation image data acquisition unit for acquiring radiation image data representing the radiation image recorded by the radiation image detector;
an exposure field area information acquisition unit for acquiring information of an exposure field area of the radiation determined by the exposure field aperture and relating the exposure field area to the radiation image data based on the information;
a white pixel determination unit for detecting pixel data of pixels within a predetermined area from adjacent to the boundary line of the exposure field area toward the inner side thereof in the radiation image data and determining whether or not the values of the detected pixel data are not greater than a predetermined threshold value; and
a blackening unit for performing a blackening process on pixel data of a pixel outside of the exposure field area and pixel data of a pixel whose value is determined to be not greater than the predetermined threshold value by the white pixel determination unit.

20. The radiation image photographing/processing apparatus as claimed in claim 19, wherein:
the apparatus comprises a blackening process selection unit for receiving a selection signal for selecting between performance and non-performance of the blackening process; and
the blackening unit does not perform the blackening process when a selection signal not to perform the blackening process is received by the blackening process selection unit.

* * * * *